Patented Mar. 24, 1942

2,277,393

UNITED STATES PATENT OFFICE 2,277,393

NONREACTIVE PIGMENT

Harlan A. Depew, Columbus, Ohio, assignor to American Zinc, Lead & Smelting Company, St. Louis, Mo., a corporation of Maine No Drawing. Application May 29, 1939, Serial No. 276,455

2 Claims. (Cl. 106—296)

This invention relates to pigments, and especially to pigments of reduced reactivity when embodied in a paint vehicle.

When a paint is made by grinding zinc oxide alone or with other pigments and ingredients in linseed oil, for example, there is a reaction between acids in the oil and zinc oxide to form zinc soaps. These zinc soaps can have a bad effect on the weathering of paint, and the natural conclusion from this is that a vehicle of low acidity should be used in making outside white house paints. The consequence of this conclusion would be that the vehicle would have to be adjusted to meet the zinc oxide's weakness, but in many cases it is desirable to use vehicles that are acidic and that may or may not contain linseed oil. It is better, therefore, to correct the weakness of the zinc oxide rather than require that the other ingredients of the paint must be modified for use with zinc oxide.

I am aware that zinc oxide has been coated with many materials, including fatty acids, various organic materials, and alkalis, but these treatments have not made a less reactive zinc oxide, nor have the coatings been inert. By "inert coatings" I mean a coating that does not dissolve or react when embodied in paint vehicles, but behaves like an inert such as barytes.

In the simplest form of my invention I dissolve an organic material, such as a partially reacted soluble phenol-formaldehyde resin in an organic material such as benzene, and I then apply this solution to the zinc oxide or other pigment and then dry and heat the same to thermoset the coating material. I prefer to apply said solution by spraying the same onto the pigment particles. In the case of zinc oxide this can be done as the zinc oxide leaves the refinery. Instead of applying an organic solution as such to the pigment, the phenol and formaldehyde can be partially reacted and the resulting milky suspension then applied to the pigment particles by spraying or otherwise, reaction being completed after such application. For example, alkali, phenol and formaldehyde may be sprayed or otherwise condensed upon the zinc oxide pigment and caused to react thereon to form an insoluble inert coating. In some cases the ingredients may be vaporized and then condensed upon the surface of the pigment where they react to form the desired inert coating. Or the reactive ingredients can be vaporized or sprayed into a pipe line or trail used in the manufacture of zinc oxide and may then be made to condense on the zinc oxide and react while thereon to form the desired inert coating. In such cases I have added the ingredients at a relatively high temperature of from 150° C. to 250° C., and preferably I partially cool the fume to cause condensation of the vapors thereon. Then on increasing the temperature and holding the increased temperature for a few moments in an expanded insulated section of the trail, the coating forms and becomes thermoset. This method of adding the coating material in a trail is of course, only applicable to French process zinc oxides or to those lower grade American process zinc oxides that are not reheated after collecting in the bag room.

In all these methods of coating the zinc oxide to reduce its reactivity, it is desirable to use as light colored coating materials as possible except for special cases. For this reason urea-formaldehyde and glycerin phthalic acid types of compositions are usually preferred to phenol-formaldehyde combinations.

These coatings may chemically combine with the zinc oxide and develop firm adhesions and further result in superior coatings.

As an example of my process, 50 pounds of zinc oxide (Azo-55) were placed in a slowly rotating drum and 0.125 pound (¼%) glycerin was sprayed on the zinc oxide. Then 0.125 pound (¼%) phthalic acid, dissolved in alcohol, was quickly sprayed onto the oxide. The outside of the drum was then heated slowly and the temperature brought up to 250° C. where it was maintained for one-half hour, after which the zinc oxide was cooled and disintegrated, and the oxide particles were found to be effectively coated with a relatively inert glycerin-phthalic acid resin. By "inert" I mean, as indicate above, a resin that does not dissolve or react readily with paint vehicles.

While the process of securing the insoluble inert coating is applicable to a variety of pigments, it is particularly useful in the treatment of zinc sulfide and zinc oxide pigment and especially the latter. Not alone do these coatings reduce the reactivity with paint vehicles but they also prevent moisture from affecting the pigment. This is most important in the case of zinc sulfide pigments that are thereby rendered light stable. Zinc oxide thus treated is of special value in the production of a better weathering paint when linseed oil or other paint vehicles are used, and it can be used in enamels where it is normally considered incompatible. By reason of the reaction of the coating ingredients after such ingredients have been applied to the pigment particles, the effectiveness of the coating in protecting the pigment from the acidic paint vehicles is greatly increased, while the simplicity of the operation materially reduces the cost of applying the coating.

What is claimed is:

1. A process of coating zinc oxide pigment which consists in applying to separate individual particles of the pigment a plurality of ingredients capable of reacting with each other to produce a synthetic resin and causing said ingredients to react in situ with each other while on the separate particles and produce thin separate coating films of a synthetic resin on the individual particles.

2. As a new product, a mass of separate zinc oxide pigment particles the individual particles of which each has a thin individual separate coating film of a synthetic resin.

HARLAN A. DEPEW.